Feb. 27, 1934.          C. J. DE MUTH          1,948,937
                         FOOD SERVICER
                       Filed Nov. 19, 1929          4 Sheets-Sheet 2
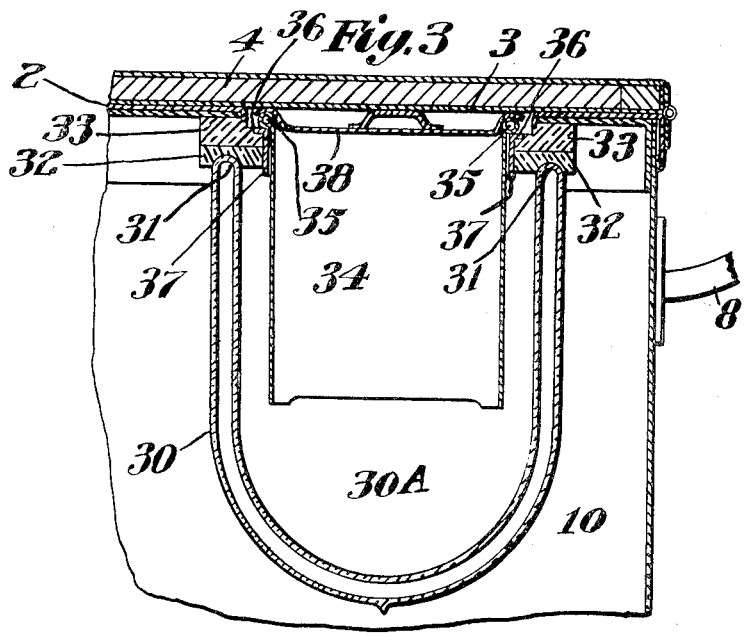
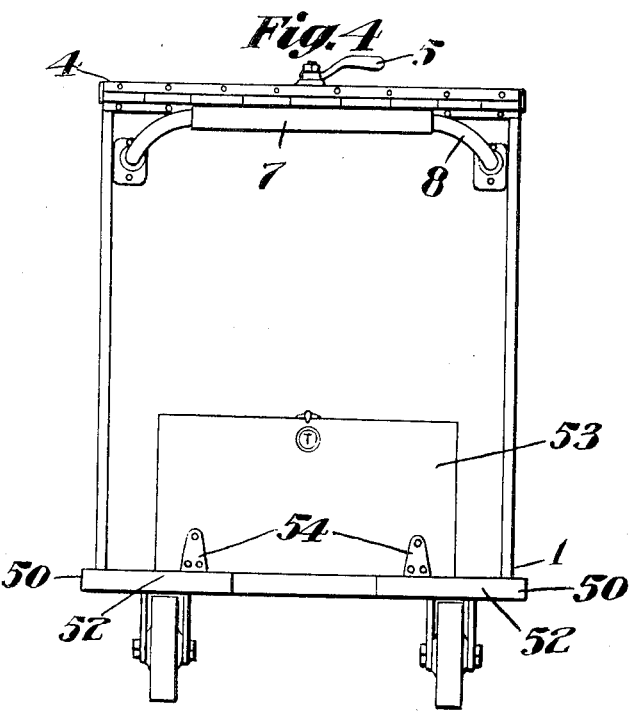
Inventor
Charles J. DeMuth
By Attorney

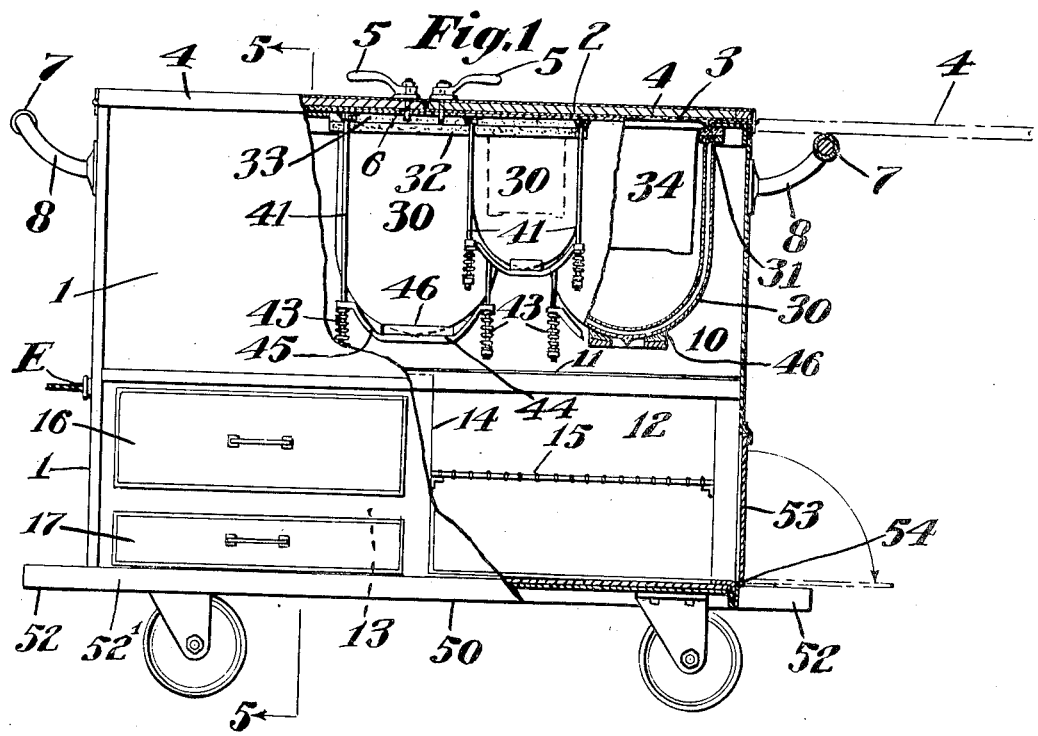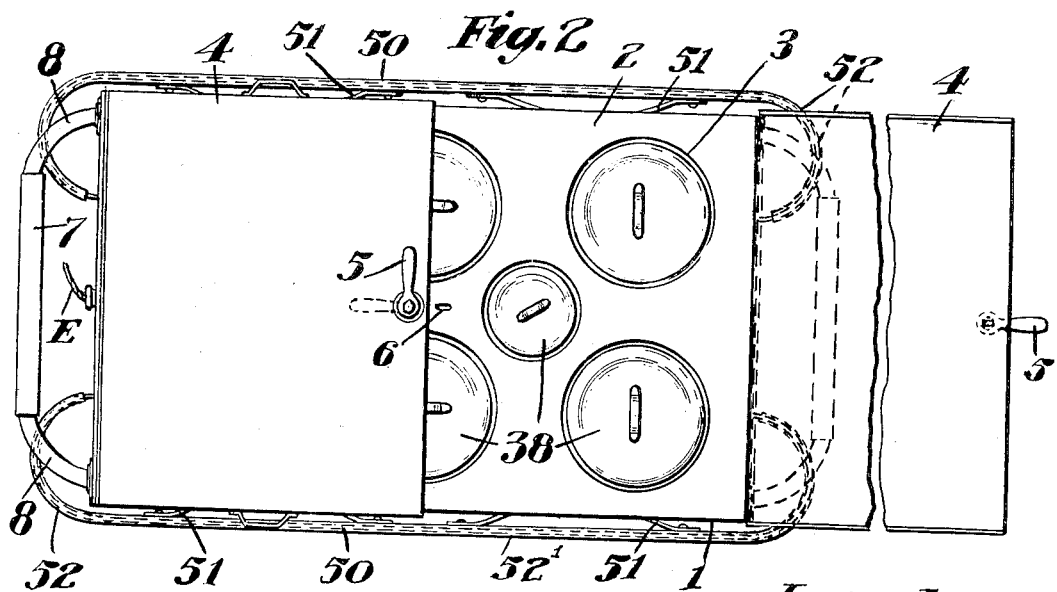

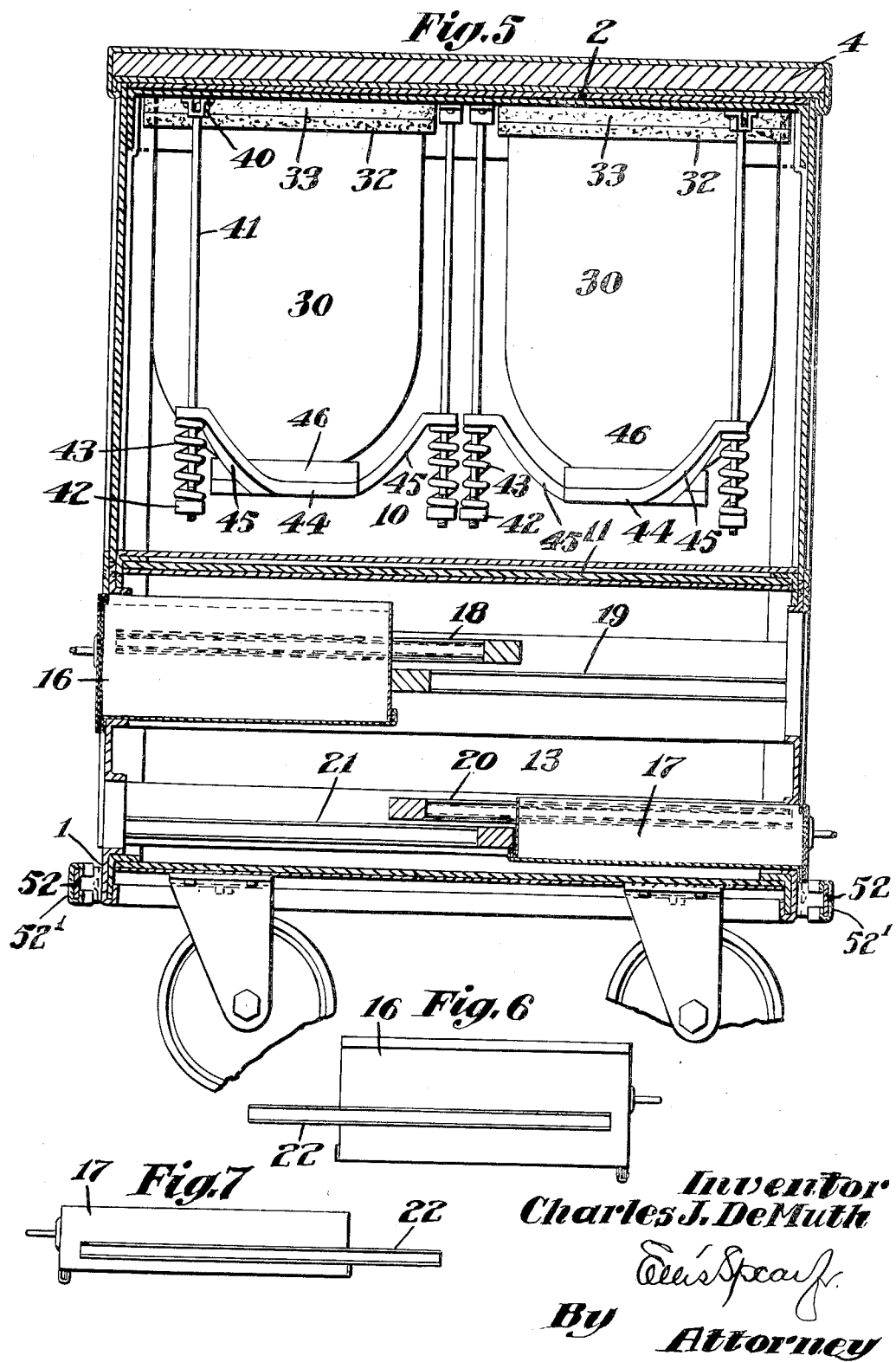

Feb. 27, 1934.                    C. J. DE MUTH                    1,948,937
                                  FOOD SERVICER
                               Filed Nov. 19, 1929                 4 Sheets-Sheet 4
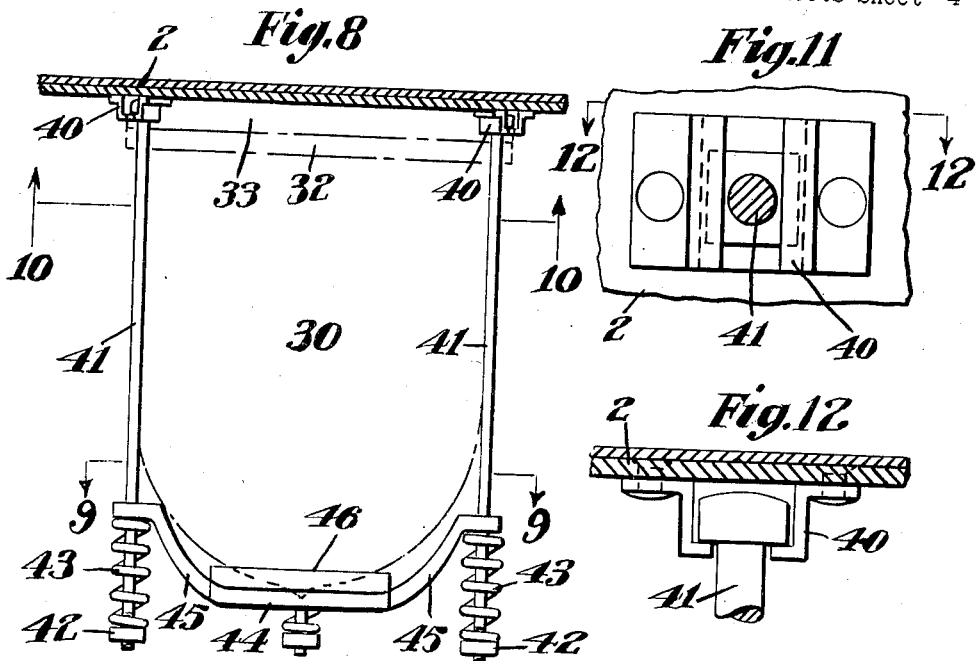
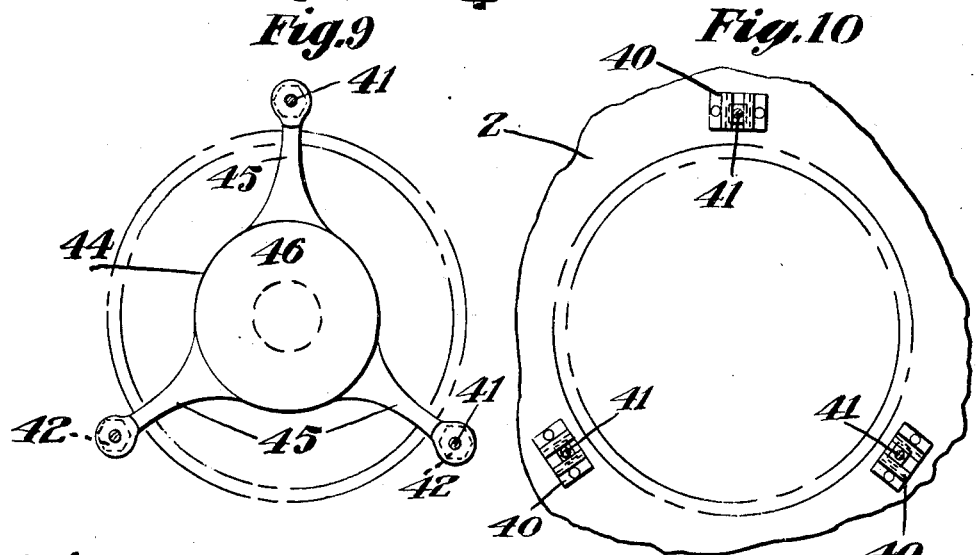
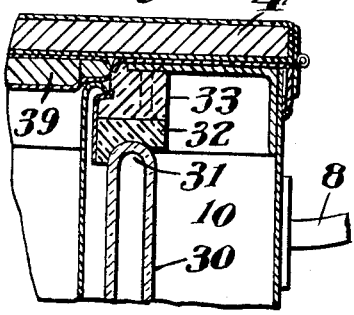
Inventor
Charles J. DeMuth
By Attorney Patented Feb. 27, 1934

1,948,937

UNITED STATES PATENT OFFICE 1,948,937

FOOD SERVICER

Charles J. De Muth, Boston, Mass., assignor, by mesne assignments, to Jones, McDuffee & Stratton Corporation, Boston, Mass., a corporation of Massachusetts Application November 19, 1929
Serial No. 408,285

18 Claims. (Cl. 220—1)

This invention relates to food servicing equipment and has particular bearing on the maintenance of desired thermal conditions in hot and cold food during the period of dispensing or delivery as well as convenient and efficient structural features important in such service.

Various features of the invention are capable of embodiment in both movable and stationary devices, such as so-called hot and/or cold food service tables which may serve either hot or cold food, so-called service trucks for hospital or hotel use or other uses where the insulation of different kinds of foods at different temperatures is desired.

As illustrative of the invention the matter of food service in hospitals will be discussed somewhat specifically because it involves a maximum of difficulties and unusual exacting requirements. Most of these are present in one phase or another in other uses and I do not wish to be considered as limited in any respect by such illustrative treatment as the utility of the various features of my invention is general as well as specific.

Various types of food trucks have been devised for hospital service and various efforts have been made to provide for the insulation of hot and cold foods or for the addition of heat and for facilities in handling. One of the difficulties encountered has been that of providing transportation means such as a service truck of such capacity as to supply the usual ward or other unit requirements and yet be sufficiently light so that it might be moved about easily and quietly.

The matter of internal accessibility has also been a great problem in view of the necessity that foods, including those of liquid character be transported up ramps or like inclines, over sills, onto elevators where the truck of necessity is so tilted as to incur danger of spilling. The common use of liquids, as for example, hot water, as an insulating material around food containers, add excessive weight and danger of spilling. Not only do the vertical rockings of the truck give difficulty, but in the handling of such trucks there is much unavoidable contact with corners or protruding objects. This results not only in undesirable shocks to the truck itself, but causes much general damage to walls and fixtures which in the end amounts to considerable expense for repairs and upkeep.

The present invention contemplates certain principles, structural features and arrangements providing for lightness, strength and efficiency. These features will be more fully discussed and described in the specification which follows and are shown in the accompanying drawings as follows:

Fig. 1 is a side elevation, partly sectioned, of a truck in accordance with my invention.

Fig. 2 is a plan view thereof with one cover opened to expose the apertured top.

Fig. 3 is an enlarged sectional view of a shell and container assembly.

Fig. 4 an end view of the truck,

Fig. 5 a transverse section on the line 5—5 of Fig. 1.

Figs. 6 and 7 are side views of the drawer mountings.

Fig. 8 is a detail of the insulating shell suspension.

Fig. 9 a bottom view of Fig. 8.

Fig. 10 a section on the line 10—10 of Fig. 8.

Fig. 11 a sectioned detail of the shell hanger suspension.

Fig. 12 a side view sectioned on the line 12—12 of Fig. 11, and

Fig. 13 an enlarged detail of modification of cover for shell assembly.

The embodiment shown is a truck and particularly adapted for hospital or like use. It comprises a walled housing generally indicated at 1 having a top apertured as at 3.

The top consists of an underlying top member 2 which supports the shells and a finishing top plate 2a which overlies the member 2 and affords a smooth surface and is carried around all corners and edges of openings.

The top is covered by a pair of closure leaves 4 hinged one at each end and abutting at the center of the top where they are locked down by the catches 5 which engage with the top 2 through slots 6. The leaves 4 are metal faced but internally thermally insulated. When opened out as indicated in broken lines in Fig. 1 and in fragment in Fig. 2 these leaves rest on the rubber grips 7 of handles 8 on the ends of the truck. These are there so positioned as to support the leaves as flat shelves when opened out.

Internally the housing 1 comprises an upper compartment or chamber 10 formed by a transverse wall 11 and below this are transverse chambers 12 and 13, separated by an insulating wall 14. The chamber 12 is preferably provided with a gridded wire shelf 15 while the chamber 13 is insulated and is fitted with two sets of drawers 16 and 17, one pair on each side.

Either or both of these compartments 12 and 13 may be heated by electricity, a plug connection being indicated at E in Fig. 2, in accordance with usual practice in portable hot tables and trucks.

The upper and lower drawer pairs 16 and 17 are mounted on long channel slideways 18 and 19, 20 and 21. As shown in Fig. 5 these slideways are staggered and overlap so as to give an extended bearing to the slide strips 22 which are channel pieces fixed to the sides of the drawers 16 and 17. This permits the drawers to be pulled out to full clearance without becoming disengaged.

In the chamber 10 I provide for a plurality of individually insulated compartments in the form of shells 30 accessible through the apertures 3 of the top 2. These shells 30 may be of any desired sizes and numbers and disposed and arranged as desired.

As shown in Figs. 1 and 3 these are preferably open ended vacuum walled members of a general bell or dome shape and having a wide upturned upper end or mouth the lip 31 of which bears against a soft rubber cushion 32 attached to the under face of an annular frame 33 preferably of hard rubber or other insulating material. The frames 33 are attached to the metal top 2 and serve to insulate it from the metal container 34 which is hung by its flange bead 35 on the shoulders 36 of the frame 33. This shoulder is metal faced as at 37 but the facing does not contact the metal of the top 2 but is insulated from it by the rubber frame 33.

The container 34 which is preferably of stainless steel may be an original cooking vessel and if desired can be transferred directly from the range to the shell in which it is suspended as shown. These vessels are preferably considerably shorter than the shell 30 and are flat bottomed leaving the dome cavity 30ᴬ available as a hot water jacket when so desired.

The shells 30 as above stated are preferably vacuum walled glass bells or domes and as such are fragile and apt on breakage to collapse explosively. This has been one of the serious deterrants to the use of such articles especially in hospitals where nerve tension is a factor. Not only is the noise of any such collapse a factor but obviously the shattered glass is a serious matter if not confined and controlled.

In this regard my chamber 10 is important. It houses and protects the shells 30. It encloses and muffles breakage if such occurs. It confines and retains the flying particles of glass and by reason of its accessibility makes repairs and replacements easy and better still permits frequent inspection and ready adjustment as will be later described.

The containers 34 are as indicated, each independently suspended from the top 2 and each shell 30 is also independently suspended from the top 2 so that not only is each container and its enclosing shell separately and independently held and supported but each of these shell and container assemblies is independent of each other. This feature is of great importance both as a matter of construction and maintenance, but is a most important factor in the isolation of each container and the prevention of penetration of broken glass into any food container. It also is a contributing factor to the novel cover system by which the large mouth container vessels are tightly closed by the hinged top cover flaps without the need of clamps or other cover fastenings.

As will have become apparent from the foregoing the matter of fastening or holding such shells in position is difficult. They must be firmly but not rigidly sustained about the food container. They must be separate from the food with no possibility that the glass splinters can penetrate the food containers. They must be readily replaced or adjusted and capable of being kept clean or sterile.

For all this I provide a fastening system of suspension type including factors of resiliency, adjustability, removability and free accessibility.

Referring to Figs. 8 to 12 I provide about the frames 33 spaced slotted brackets 40 into which may be slipped the heads of hanger rods 41. These are threaded at their lower ends to receive adjusting nuts 42 above which are coiled about the rods 41 springs 43. These yieldingly but compressibly sustain the spider 44 having arms 45 through the ends of which the rods 41 pass. Centrally of the spider 44 is a cushion 46 for the dome center of the shell 30.

In this way the shell 30 is firmly but yieldingly supported. Its upper edge or lip 31 is pressed tightly against and into the soft rubber or other resilient material of the cushion 32.

By means of such suspension the shell is independent of the container 34 while affording it complete thermal isolation from its fellow shells in their common chamber 10.

The containers may be variously covered as at 38 in Fig. 3 or by a cover 39 in Fig. 13. The former shows a simple one piece type of cover and the latter an insulated type.

In such a truck and with such shell members the problem of shock is a serious one. At best a service truck is somewhat clumsy to handle and is handled by attendants under circumstances usually difficult. Contacts between truck and structural projections are practically unavoidable. I therefore provide a fender system which affords protection from practically all angles. My fenders consist of side bars 50 spaced from the truck housing 1 about its base. The bars 50 are slidably and resiliently supported by springs 51 on the truck sides. The bars 50 are flat members the face and edges of which are enclosed by a moulded rubber channel strip 52'. The ends of the bars 50 are turned in substantially a half circle 52 thus enclosing the corners of the truck and receiving or transmitting shocks. The fender system therefore practically encloses the truck about its contact area. The only portions not actually enclosed are the middle end planes and these are protected by the rubber cover grips 7 of the end handles 8.

At the end of the truck I provide a shelf 53 hinged at 54 so that it can be swung down as shown in dotted lines in Figs. 1. In this position it rests on the curved ends 52 of the fender 50 so as to be supported thereby in horizontal position. It is convenient for carrying unusually large articles like milk cans, pails or like extra articles not capable of being contained in any of the truck compartments.

What I therefore claim and desire to secure by Letters Patent is:

1. In a food servicer of the class described, a walled compartment having an apertured top, an insulating frame member about said aperture, means for supporting a container from said frame, a cushion member adjacent the aperture of the top, a vacuum walled shell having an open upper end, and means depending from said top for resiliently supporting said shell with its end lip against said cushion, said means being suspended from said top.

2. In a food servicer of the class described, a walled compartment having an apertured top, an insulating frame member attached to the lower side of the top and surrounding said apertures, means on the frame for supporting a container beneath its aperture and in insulated relation to said top, a cushion member on said frame, a vacuum walled shell having an open upper end, and means depending from said top for resiliently supporting said shell from the top with its lip against said cushion.

3. In a food servicer of the class described, a walled compartment having an apertured top, an insulating frame member attached to the lower side of the top and surrounding said apertures, means on the frame for supporting a container beneath its aperture and in insulated relation to said top, a cushion member on said frame, a vacuum walled shell having an open upper end, hangers depending from the top and bottom engaging arms resiliently supported thereon and engaging the shell bottom.

4. In a food servicer of the class described, a walled compartment having an apertured top, an insulating frame member attached to the lower side of the top and surrounding said apertures, means on the frame for supporting a container beneath its aperture and in insulated relation to said top, a cushion member on said frame, a vacuum walled shell having an open upper end, spaced supporting rods depending from the top, supporting means carried by the rods and having cushioned engagement with the shell bottom, and means for resiliently tensioning said means to press the shell against the cushion.

5. In a food servicer of the class described, a walled compartment having an apertured top, an insulating frame member attached to the lower side of the top and surrounding said apertures, means on the frame for supporting a container beneath its aperture and in insulated relation to said top, a cushion member on said frame, a vacuum walled shell having an open upper end, spaced supporting rods depending from the top, supporting means carried by the rods and having cushioned engagement with the shell bottom and means for resiliently tensioning said means to press the shell against the cushion, including coiled springs about the rods and followers threaded on said rods below said springs.

6. In a food servicer of the class described, an apertured top, means for suspending a vessel from the top beneath the aperture, a cushion member disposed about the aperture, a vacuum walled shell having an open upper end, slotted brackets about the top aperture, depending rods having heads detachably engaged in said slots, a spider slidably mounted on said rods and having a cushion for the shell bottom, coiled springs about the rods under the spider ends and threaded followers on said rods for tensioning the springs to support the shell against the top cushion.

7. A food service apparatus, a housing having an apertured top, a compartment beneath said top and a plurality of open topped insulating shells resiliently suspended from said top within said chamber and aligned with said apertures, removable containers freely fitting within said shells, means for supporting said containers from said top in spaced guided relation to the shell walls and insulated therefrom.

8. A food service apparatus, a housing having an apertured top, a compartment beneath said top and a plurality of open topped insulating shells resiliently suspended from said top within said chamber and aligned with said apertures, removable containers freely fitting within said shells and terminating short of the bottom thereof to leave a chamber, means for separately supporting said containers from said top in spaced guided relation to the shell walls and insulated therefrom.

9. A food service truck or like dispenser comprising a housing having an apertured top, a compartment beneath said top and a plurality of insulating shells suspended from said top within said chamber and aligned with said apertures, removable containers freely fitting within said shells, means for supporting said containers from said top in spaced guided relation to the shell walls and insulated therefrom, a laterally opened insulated lower compartment below the top compartment and drawer members on each side of said lower compartment.

10. In a food servicer having an apertured top, a food container suspended from said top beneath a top aperture, and a vacuum wall insulating shell disposed about said container in spaced relation thereto and resiliently suspended from said top but independently of said container support, and a cover for said container.

11. In a food servicer having an apertured top, a food container suspended from said top beneath a top aperture, insulating shell disposed about said container in spaced relation thereto and resiliently suspended from said top, and a cover for said container and disposed within the container supporting means.

12. In apparatus of the class described, a housing having an apertured top, a container beneath said aperture and a vacuum walled shell about said container but spaced therefrom and resiliently suspended from said top.

13. In apparatus of the class described, a housing having an apertured top, a container beneath said aperture and a vacuum walled shell about said container but spaced therefrom, and means for resiliently suspending said shell from said top housing.

14. In apparatus of the class described, a walled housing having an apertured top, a container beneath said aperture and a vacuum walled shell about said container but spaced therefrom, and resiliently suspended from said housing and spaced from said walls.

15. In apparatus of the class described, a walled housing having an apertured top, a container beneath said aperture and insulated from said top and a vacuum walled shell about said container but spaced therefrom and resiliently suspended from said housing and spaced from said walls.

16. In a food servicer of the class described, a walled compartment having an apertured top, an insulating frame member about said aperture, said frame member having a shoulder within said aperture and insulated from said top by said frame member, a metal container having a flanged bead adapted to bear on said shoulder and be supported thereby in insulated relation to said top.

17. In a food servicer of the class described, a walled compartment having an apertured top, an insulating frame member about said aperture, said frame member having a shoulder within said aperture, a metal facing on said shoulder, and insulated from said top by said frame member, a metal container having a flanged bead adapted to bear on said shoulder and be supported thereby in insulated relation to said top.

18. In a food servicer of the class described, a walled compartment having an apertured top, an insulating frame member about said aperture, said frame member having a shoulder within said aperture, a metal facing on said shoulder, and insulated from said top by said frame member, a metal container having a flanged bead adapted to bear on said shoulder and be supported thereby in insulated relation to said top, a cushion on the under face of said insulating frame, and a vacuum walled shell about said container and means for holding said shell with its lip against said cushion.

CHARLES J. DE MUTH.